Patented June 17, 1941

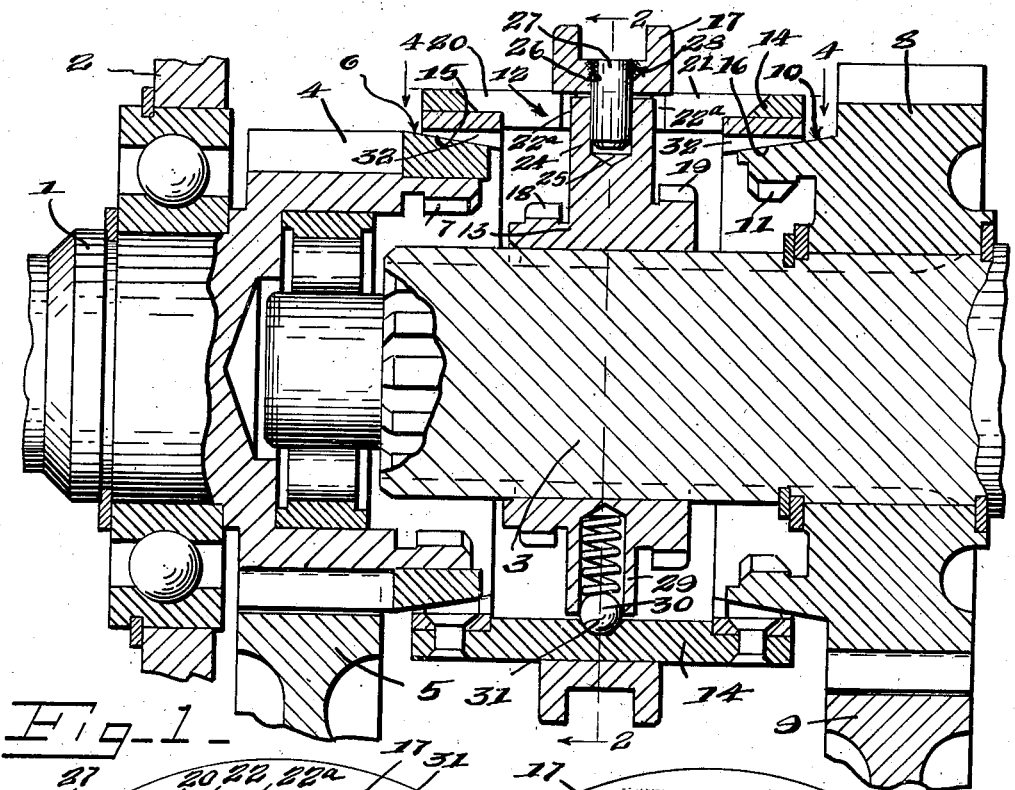

2,245,816

UNITED STATES PATENT OFFICE 2,245,816

SYNCHRONIZING CLUTCH CONSTRUCTION

Carl D. Peterson, Toledo, Ohio

Application December 29, 1939, Serial No. 311,619

3 Claims. (Cl. 192—53)

This invention relates to synchronizing clutches in which a shiftable clutch element embodies a toothed section and a friction section shiftable to engage the clutch face with a complemental clutch face of another clutch element, preliminary to the inter-engagement of jaw or toothed faces of said elements, and has for its object a particularly simple and economical construction of the shiftable clutch element.

It further has for its object a synchronizing clutch element embodying a toothed section and a friction section, the latter being in the form of a sleeve having a limited rotary movement relative to the toothed section, the sleeve being provided with lengthwise slots, each formed with a widened intermediate portion, and the toothed section having radial posts or cam blocks extending into the slots and of such width as to slidably fit the end portions of the slots and permit the relative rotary movement when in the widened intermediate portions of the slots, the wider intermediate portion taking the form of notches on opposite sides of each slot and the cam posts or blocks coacting with the ends of the notches at different angles, when a shift is being made from a lower gear into a higher gear, than when a shift is being made from a higher gear into a lower gear, or in other words, the angle of engagement of the end walls of the notch on one side of the slot is less than the angle of engagement with the cam posts on the opposite side of the slot.

The invention consists in the novel features and in the combinations and constructions hereinafter set forth and claimed.

In describing this invention, reference is had to the accompanying drawing in which like characters designate corresponding parts in all the views.

Figure 1 is a fragmentary sectional view through a transmission gearing embodying this synchronizing clutch.

Figure 2 is a fragmentary sectional view on line 2—2, Figure 1, partly in elevation.

Figure 3 is a fragmentary end view of the shiftable clutch element.

Figure 4 is a fragmentary view of the periphery of the friction section or sleeve, taken on line 4—4, Figure 1.

The clutch here illustrated is shown as located to connect the input and output shafts of a change speed transmission gearing in direct drive relation and in indirect drive relation through a train of gears, with the shiftable clutch element splined to and shiftable axially of the output shaft, although, in so far as the invention is concerned, the clutch may be used in any situation, where two elements are to be clutched together.

1 designates the input shaft, which is journalled suitably within a housing or gear box 2; 3 the output shaft mounted in axial alinement with the input shaft 1.

4 designates a gear on, and here shown as integral with, the input shaft 1 and meshing with a gear 5 on the countershaft, not shown, of a conventional change speed transmission gearing. The gear 4 is also for convenience a clutch gear or driving clutch element and formed with a friction clutch face 6 and a toothed or jaw clutch face 7. 8 designates a gear element rotatably mounted on the output shaft 3 and meshing with a gear 9 on the countershaft not shown. The gear 8 also is a clutch gear or driving clutch element having a friction face 10 and a toothed clutch face 11.

12 designates a double synchronizing clutch element, as a whole, for coacting with either the driving clutch element 4 or 8. The synchronizing clutch element includes an inner or toothed section 13 splined on and shiftable axially of the output shaft 3, and a friction section 14, in the form of a sleeve, mounted on the inner section 13 and having friction clutch faces 15 and 16 at its opposite ends for coacting respectively with the friction faces 6 and 10 of the driving elements 4 and 8. The clutch element 12 also includes a shifting collar 17 encircling the sleeve 14 and connected to the inner section 13. The sleeve 14 and the toothed section 13 are capable of relative rotary movement, within limits, for so positioning them, as to block or retard engagement of the toothed faces 18 and 19 of the inner section 13 with the toothed faces 7 and 11 of the elements 4 and 8 respectively, until the speeds of the elements to be clutched together are synchronized.

One of the objects of this invention is the assembly of the collar 17 and the inner toothed section 13. In so far as the assembly feature is concerned, the invention is pertinent to a single clutch as well as to a double clutch shiftable axially from neutral in opposite directions. The sleeve 14 is provided with lengthwise slots having widened central portions providing opposite end portions 20 and 21 for which the wider portions 22, 23 constitute entrances. The widened portions 22, 23 take the form of wide notches. The inner section 13 is provided with radial projections or posts 24 extending into the slots and normally arranged in the wider central portions thereof and shiftable into either end portion 20 or 21 and slidably fitting the same. These posts are provided with radial bores 25 opening through their outer ends. The collar 17 is formed with radial passages 26 therethrough alined with the bores 25, these passages 26 opening through the bottom of the groove in the collar which receives the shifting fork, not shown. The collar 17 and the inner section 13 are firmly and rigidly held assembled, as a unit, by pins 27 snugly fitting the bores 25 and being placeable or driven therein through the passages 26, the pins fitting with a drive fit. The pins are then secured to the collar 17, preferably by welding, as at 28. Thus, the shifting collar 17 and the inner section 13 of the clutch element 12 are fixedly assembled in an extremely simple and economical manner. The inner clutch section 13 is case hardened and then the hardened ends of the posts, or the skin at the ends of the posts machined off, the bores 25 then bored while using the collar 17 with the passages 26 therein as guides for the tools. The inner section 13 is also provided with other radial posts 29 having radial bores for receiving spring-pressed poppets 30 coacting with an inner circumferential cam groove 31 in the sleeve section 14. These poppets form no part of the invention. They normally hold the sections so that the sections shift as a unit until synchronizing is effected through the friction section and then permit further axial shifting of the toothed section relative to the friction section, as is well undertsood.

Preferably, the clutch faces 15 and 16 of the sleeve section 14 are conoidal in general form, but are interrupted transversely, as at 32, and when viewed, as shown in Figure 3, have the appearance of teeth with inclined top faces.

In operation, assume for the purpose of illustration that the clutch 12 controls the second and third speeds in a three-speed transmission, and a shift is to be made from first speed into second speed, that is, the clutch 12 is to be shifted to the right (Figure 1) from neutral position to clutch the gear 8 with the output shaft 3, the shaft having previously been driven from the countershaft in first speed forward, and the selecting and shifting mechanism operated to unclutch the first speed forward clutch preliminary to operating the clutch 12 into second speed forward. Upon shifting of the clutch element 12 to the right, the friction clutch face 16 will first engage the friction face 10 of the clutch gear 8 causing said gear, which is rotatable about the output shaft 3, to shift the sleeve section 14 circumferentially in the direction of the arrow A (Figure 4) relatively to the inner toothed section 13, which is rotating with the shaft 3, it being borne in mind that the clutch gear 8, which is normally rotatable about the output shaft 3, has been actuated idly through the second speed gear ratio. This brings the end of each cam post 24 into the notch 22 (Figure 4) until the speeds synchronize, whereupon continued shifting pressure applied to the section 13 through the shifting collar 17 shifts the cam post 24 into the end portion 21 of the slot, bringing the clutch teeth 19 into interlocking engagement with the clutch teeth 11. The same action takes place when the shift is being made from second to third speed, when the clutch 12 is first shifted back to neutral, and then because of the driving action, through the friction clutch faces 6 and 15, causes the cam post 24 to initially enter the notch until the speeds are synchronized, when the cam post is free to enter the end portion 20 of the slot to bring the clutch teeth 18 into interlocking engagement with the clutch teeth 7. When a shift is being made down, say from third to second, the clutch section 13 is first shifted to the right to neutral position, and then further to the right to first engage the friction face 16 of the sleeve section with the friction face 10 of the clutch gear 8. Now, as this clutch gear is rotating idly, through the second speed ratio, and hence slower than the output shaft 3, the sleeve section 14 is rocked in a direction opposite to the arrow A (Figure 4), so that the cam post 24 enters the notch 23 and remains until the speeds synchronize, permitting the cam post to be shifted into the end portion 21 of the slot to engage the clutch teeth 19 and 11. When a shift is being made into the direct drive, but the input shaft 1 is being driven slower than the output shaft 3, or the output shaft acting as a driver through any gear ratio will cause the toothed clutch section 13 to rotate slightly ahead of the sleeve 14, causing the cam post to enter the notch 23 and there remain until the speeds of the drive and output shafts synchronize, or the speed of the input shaft builds up to the speed of the output shaft, or the speed of the output shaft drops down to that of the input shaft, permitting the cam post 24 to be shifted to the left, into the end portion 20 of the slot.

Thus, in a three-speed transmission, for example, the shift to third speed or direct drive is always a shift up from a lower speed, and hence the driving element of the clutch, that is, in this instance, the clutch and the trains of gears through the countershaft has to slow down in making the shift; on the other hand, a shift into second speed may be a shift up from first speed or a shift down from third speed. A shift up into third speed may in effect be the same as a shift down, when the input shaft 2 is running slower or the output shaft is running as a driver, as when coasting.

In a shift up, as from first to second, or from second to third, it is not necessary that the synchronizer or friction section 14 do any work on the gear train and the clutch driver 4 or 8, as the case may be, whether the shift is from second to third, or from first to second, as slowing down effect, due to bearing friction, wind resistance, etc. on the vehicle, will gradually slow down the gear train and the speeds will become equalized and finally cross to unlock the section 13 and the cam post 24 first carrying into the notch 22, and then when the speeds synchronize, may be readily shifted into the end portion 21 of the slot, if the speed is from first to second, or into the end portion 20, if the shift is from second to third. Any pressure exerted on the shifting lever to the shifting collar 17 merely applies the pressure to the friction section 13 harder to make the slowing down faster. For a fast shift, a certain amount of pressure is required, but the shift may be readily made in any event, if pressure on the shifting lever is only enough to effect a negligible pressure or braking effect on the friction section 14. The minimum value of the pressure required under these conditions, that is sufficient to slide the cam post 24 down the cam angle at the ends of the slot 22. The pressure required to dislodge the poppets 30 out of the groove 31 is usually greater than that required to move the cam post 24 out of engagement with the end walls of the notch 22.

Another feature of this invention is the forming of the end walls 22ᵃ of the notch 22 of a less angle, so as to have a less blocking effect than the end walls 23ᵃ of the notch 23. For the purpose of illustration, the angular engagement of the cam post 24 and the end wall 22ᵃ is 25°, while the cam post 24 and the notch 23 and the end wall 23ᵃ of the notch 23 is 30°. In shifting up from first to second or second to third, it is necessary to dislodge the cam post 24 from the blocking effect of the end wall of the notch 22, and hence for the reasons just explained, the angular engagement is less on the end wall of the notch 22 than on the end wall of the notch 23 in which the cam post 24 is located, when a shift is made down from third to second or up from second to third when the input shaft is rotating slower than the output shaft 3.

Shifting down from a higher to a lower gear ratio in this instance, from third to second speed requires sufficient friction between the cam post 24 and the friction section 14 to overcome the frictional drag on the gear train, as well as the inertia of the gear train, to speed the gear train up to the higher speed, until the speeds are equal; then as the cam post 24 slides down the cam angle 23ᵃ, the train of gears must be speeded up still slightly more. If the cam is too abrupt or flat, shifting will be difficult, since this last increase in rotation of the gear train is accomplished by sliding down the cam angle. Thus for a shift down the cam angle must be steep to accomplish the shifting and the limit of steepness determined by the point at which the cam post 24 will not lock and hold while there is slippage between the friction section 14 and the friction face 10 of the clutch gear 8. The angle at 23ᵃ depends in any particular installation upon the co-efficient of friction at the cam surface 23ᵃ as compared with the friction at the friction surfaces 16 and 10, the angle of the cone of these faces and the relation between the radii of the friction surfaces to the radii of the cam surface 23ᵃ.

As the engine or input shaft of a motor vehicle always rotates in the same direction, a shift up will place the cam post 24 against the same cam angle on one side of the slot portions 20, 21, that is, in the notch 22, and a shift down will place the cam post 24 against the cam angle on the opposite side of the slot portions 20, 21, that is, in the notch 23. Thus, it is apparent that the two cam angles at 22ᵃ and 23ᵃ may be different and the angle used in the shift down greater than the angle used in the shift up. Hence, the angle 22ᵃ at the end of the notch 22, which comes into coaction with the cam post 24 when the shift up is to be made from first to second or from second to third, is less, as 25°, than when the shift down is to be made and the cam post 24 coacts with the notch 23.

Usually when a shift is being made, the input shaft and parts actuated thereby are rotating at a greater speed than the output shaft. When the input shaft is rotating slower than the output shaft or being driven by the output shaft under the momentum of the vehicle, as when coasting, a shift up from a lower speed to a higher speed is analogous to a shift down under normal conditions, when the input shaft is rotating the faster.

Such analogous action takes place, when a shift up is to be made, as a shift into third speed, when the engine shaft or input shaft 1 is running slower than the output shaft 3, or the output shaft 3 is acting under momentum, as a driver, as when coasting. In making a shift up under such conditions, the cam post 24 is initially in the notch 23 and coacts with the end 23ᵃ at the left end of the slot 23 (Figure 4), until the speeds equalize, and the greater 30° angle of this end wall 23ᵃ effects enough friction under this condition to facilitate the synchronization with pressure being applied to the gear shifting lever acting on the collar 17.

The blocks 24 are shown as rectangular with the corners beveled for coacting with the end surfaces 22ᵃ and 23ᵃ of the notches 22 and 23 respectively, but the blocks would coact with the same angles or with the same effect if they were round blocks or rollers. The corners of the blocks 24 are, however, usually of the same angles as the end surfaces 22ᵃ and 23ᵃ.

What I claim is:

1. In a transmission gearing including a shaft and an element to be clutched to the shaft having a friction face and a toothed face, the combination of a clutch element including a toothed section rotatable with the shaft and shiftable axially thereof and having a toothed face, and a friction section in the general form of a sleeve encircling the toothed section and having a friction face for coacting with the former friction face, a shifting collar encircling the sleeve, the sleeve being formed with lengthwise slots and the toothed section being formed with a radial bore and the collar with a radial passage therethrough alined with the bore, radial pins extending through the passages of the collar and into the radial bore of the toothed section and snugly fitting said bore and being integrally united to the collar in the passages thereof, each radial bore and alined radial passage being of substantially the same diameter, whereby the pins are placeable in position, after the toothed section, sleeve and collar are assembled.

2. In a transmission gearing including a shaft and an element to be clutched to the shaft having a friction face and a toothed face, the combination of a clutch element including a toothed section rotatable with the shaft and shiftable axially thereof and having a toothed face, and a friction section in the general form of a sleeve encircling the toothed section and having a friction face for coacting with the former friction face, a shifting collar encircling the sleeve, the sleeve being formed with lengthwise slots and the toothed section having radial posts extending into the slots and formed with radial bores, the collar having radial passages therethrough alined with the bores and opening through a peripheral face of the collar, radial pins extending through the passages of the collar and into the bores and snugly fitting the same and being placeable in position through the passages in the collar and being secured to the collar.

3. In a transmission gearing including driving and driven shafts, and means for transmitting the motion of the driving shaft and the driven shaft through different speed ratios including a clutch shiftable axially in one direction to connect the shafts together through one gear ratio and in the opposite direction from neutral to connect the shafts together in another gear ratio, said clutch including a toothed section rotatable with one shaft and shiftable axially thereof and having toothed faces on opposite sides thereof, and a friction section in the general form of a sleeve encircling the toothed section and having friction faces at its opposite ends, the sleeve section having lengthwise slots formed with intermediate widened portions and the toothed section having cam posts extending into the slots and normally arranged in the widened portions, each cam post and the ends of the widened portions being arranged to coact at a less angle on one side of the slot than the angles of coaction on the opposite side of the slot, whereby during shifting into a higher gear ratio, less shifting force is required to slide the cam posts out of the intermediate widened portions of the slots than when shifting to a lower gear ratio.

CARL D. PETERSON.